United States Patent
Thubert et al.

(10) Patent No.: US 7,333,461 B2
(45) Date of Patent: Feb. 19, 2008

(54) ARRANGEMENT IN A ROUTER OF A MOBILE NETWORK FOR GENERATING A LOCAL ROUTER PREFIX FOR ANONYMOUS ROUTE CONNECTIONS

(75) Inventors: Pascal Thubert, La Colle sur Loup (FR); Patrick Wetterwald, Cagnes sur Mer (FR); Marco Molteni, Antibes (FR)

(73) Assignee: Cisco Technology, Inc., San Jose, CA (US)

( * ) Notice: Subject to any disclaimer, the term of this patent is extended or adjusted under 35 U.S.C. 154(b) by 992 days.

(21) Appl. No.: 10/454,507

(22) Filed: Jun. 5, 2003

(65) Prior Publication Data

US 2004/0246931 A1 Dec. 9, 2004

(51) Int. Cl.
*H04Q 7/24* (2006.01)
*H04L 12/28* (2006.01)
*H04L 12/56* (2006.01)

(52) U.S. Cl. ............... 370/338; 370/393; 370/401
(58) Field of Classification Search ............ 370/349, 370/329, 389, 392, 338
See application file for complete search history.

(56) References Cited

U.S. PATENT DOCUMENTS

| 7,085,241 | B1 * | 8/2006 | O'Neill et al. ............ 370/254 |
| 7,203,175 | B2 | 4/2007 | Thubert et al. |
| 7,209,978 | B2 | 4/2007 | Thubert et al. |

OTHER PUBLICATIONS

Ernst et al., "Network Mobility Support Terminology", draft-ietf-nemo-terminology-00.txt, May 2003.*
Troan et al, "IPv6 Prefix Options for DHCPv6, draft-ietf-dhc-dhcpv6-opt-prefix-delegation-02.txt", IETF, Feb. 10, 2003.*
Johnson et al., "Mobility Support in IPv6", draft-ietf-mobileip-ipv6-22.txtP, IETF, May 26, 2003.*
Johnson et al., "Mobility Support in IPv6", Internet Draft, IETF Mobile IP Working Group, draft-ietf-mobileip-ipv6-22.txt, May 26, 2003.
Deering et al., "Internet Protocol, Version 6 (IPv6)", Request for Comments: 2460, IETF Network Working Group, Specification, Dec. 1998.

(Continued)

*Primary Examiner*—Seema S. Rao
*Assistant Examiner*—Jianye Wu
(74) *Attorney, Agent, or Firm*—Leon R. Turkevich (57) ABSTRACT

A mobile router is configured for generating a local router prefix (i.e., a null or invalid address prefix that is not reachable via a wide area network) for use by mobile nodes that attempt to attach to the mobile router. The mobile router attaches to an attachment router using a care-of address with an attachment router address prefix, and outputs a router advertisement message that specifies the null address prefix. Upon receiving a message from a mobile host that includes a source address field specifying a mobile host care-of address that includes the null address prefix, the mobile router adds the mobile host care-of address to a reverse routing header and inserts its own care-of address into the source address field. The message is output to its destination with the reverse routing header, ensuring the IPv6 address of the mobile router remains anonymous in the wide area network.

21 Claims, 5 Drawing Sheets

OTHER PUBLICATIONS

Narten et al., "Neighbor Discovery for IP Version 6 (IPv6)", Request for Comments: 2461, IETF Network Working Group, Dec. 1998.

Thubert et al., "IPv6 Reverse Routing Header and its application to Mobile Networks", IETF Network Working Group, Internet-Draft, draft-thubert-nemo-reverse-routing-header-01, Oct. 11, 2002.

Thubert et al., "IPv6 Reverse Routing Header and its application to Mobile Networks", IETF Network Working Group, Internet-Draft, draft-thubert-nemo-reverse-routing-header-00, Jun. 19, 2002.

Ernst et al., "Network Mobility Support Terminology", IETF NEMO Working Group, Internet-Draft, draft-ietf-nemo-terminology-00.txt, May 2003.

Baker, "An outsider's view of MANET", IETF Network Working Group, Internet-Draft, draft-baker-manet-review-01, Mar. 17, 2002.

Conta et al., "Generic Packet Tunneling in IPv6 Specification", Network Working Group, Request for Comments: 2473, Dec. 1998, pp. 1-36.

* cited by examiner

ARRANGEMENT IN A ROUTER OF A MOBILE NETWORK FOR GENERATING A LOCAL ROUTER PREFIX FOR ANONYMOUS ROUTE CONNECTIONS

BACKGROUND OF THE INVENTION

1. Field of the Invention

The present invention relates to management of a mobile network by mobile routers, where the mobile network is capable of changing its point of attachment to a wide area network (e.g., the Internet) and thus its reachability in its associated topology.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. For example, the IETF has a Mobile IP Working Group that has developed routing support to permit IP nodes (hosts and routers) using either IPv4 or IPv6 to seamlessly "roam" among IP subnetworks. In addition, the Mobile Networks (MONET) group (renamed as the Network Mobility (NEMO) group) has published different Internet Drafts, available on the World Wide Web at the Network Mobility Home Page at the address http://www.ietf.org/html.charters/nemo-charter.html. One exemplary Internet Draft by Thierry Ernst, entitled "Network Mobility Support Terminology", May, 2003, is available on the World Wide Web at the address: http://www.ietf.org/internet-drafts/draft-ietf-nemo-terminology-00.txt, the disclosure of which is incorporated in its entirety herein by reference.

For example, Ernst describes an exemplary mobile network that can be deployed within an airplane, where passengers establish an IP connection of their respective IP host devices (e.g., laptop, digital telephone, personal digital assistant, etc.) to a mobile router within the airplane for on-board Internet access; during the flight, the mobile router within the aircraft may change its point of attachment to the Internet via distinct Internet Service Providers (ISPs), for example by changing connections via respective radio links or geostationary satellite links for transoceanic flights. Note that a passenger also may have his or her own network (i.e., a personal area network) within the mobile network.

According to the NEMO group, a mobile network may be composed by one or more IP subnets and is connected to the global Internet via one or more Mobile Routers (MR). The mobile router has at least two network interfaces: an egress interface toward the wide area network, and an ingress interface from within the mobile network. Mobile network nodes may include local fixed nodes (LFN) (nodes unable to change their point of attachment while maintaining ongoing sessions), local mobile nodes (LMN) (mobile nodes that belong to the mobile network and able to change their point of attachment within the mobile network or outside the mobile network), and visiting mobile nodes (VMN) (mobile nodes that not belong to the mobile network and that can change their point of attachment from outside the mobile network to inside the mobile network). Each of the nodes may be either a host or a router.

Hence, a mobile router is a router configured for establishing a communication link between the mobile network and an attachment router of a wide area network, such as the Internet, providing connectivity for the mobile network to the wide area network. The mobile router thus serves as a gateway to route packets between the mobile network and the Internet.

The IETF also has a Mobile Ad-hoc Networks (MANET) Working Group that is working to develop standardized MANET routing specification(s) for adoption by the IETF. According to the MANET Working Group, the "mobile ad hoc network" (MANET) is an autonomous system of mobile routers (and associated hosts) connected by wireless links— the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure. When the addressed device moves, therefore, the motion changes the routing infrastructure. Hence, as described in an Internet Draft by Baker, entitled "An Outsider's View of MANET", available from the IETF on the World Wide Web at the address http://www.globecom.net/ietf/draft/draft-baker-manet-review-00.html (the disclosure of which is incorporated in its entirety herein by reference), the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

A "Mobile IPv6" protocol is disclosed in an Internet Draft by Johnson et al., entitled "Mobility Support in IPv6", available on the World Wide Web at the address: http://www.ietforg/internet-drafts/draft-ietf-mobileip-ipv6-22.txt (the disclosure of which is incorporated in its entirety herein by reference). According to Johnson et al., the Mobile IPv6 protocol enables a mobile node to move from one link to another without changing the mobile node's IP address. Hence, a mobile node is always addressable by its "home address", an IP address assigned to the mobile node within its home subnet prefix on its home link. Packets may be routed to the mobile node using this address regardless of the mobile node's current point of attachment to the Internet. The mobile node also may continue to communicate with other nodes (stationary or mobile) after moving to a new link. The movement of a mobile node away from its home link is thus transparent to transport and higher-layer protocols and applications.

Commonly-assigned, copending application Ser. No. 10/318,179, filed Dec. 13, 2002, entitled "Arrangement in a Router of a Mobile Network for Optimizing Use of Messages Carrying Reverse Routing Headers", the disclosure of which is incorporated in its entirety herein by reference, discloses use of reverse routing headers to specify a path between an originating mobile router and a home agent. Reverse routing headers enable each mobile router within the path to the home agent to specify its care of address, enabling the home agent to establish a bidirectional tunnel to the originating mobile router via the corresponding mobile router. The mobile router selectively updates the reverse routing header in a received packet by inserting the source address value of the received packet into the reverse routing header and inserting its corresponding care of address into the source address field, based on whether the mobile router lacks a routing table entry that specifies reachability of a most recent entry in the reverse routing header via the source address value. The generation and use of reverse routing headers was published on Jun. 19, 2002 by the inventors as an Internet Draft, "IPv6 Reverse Routing Header and its application to Mobile Networks" available on the World Wide Web at http://www.globecom.net/ietf/draft/draft-thubert-nemo-reverse-routing-header-00.txt and is incorporated in its entirety herein by reference. A more recent version was published Oct. 11, 2002, available on the World Wide Web at http://www.ietf.org/internet-drafts/draft-thubert-nemo-reverse-routing-header-01.txt and incorporated in its entirety herein by reference.

A particular concern in route optimization of Nested Mobility as defined by the NEMO Working Group involves the security and privacy of mobile routers in the mobile network. In particular, a mobile router that attaches to a mobile network in a nested position may send a binding update message that includes a reverse routing header; if intermediate mobile routers populate the reverse routing header with their global care-of addresses, then the home agent of the mobile router is able to determine the global network addresses or network prefixes of the intermediate mobile routers from the reverse routing header.

SUMMARY OF THE INVENTION

There is a need for an arrangement that enables communications between a nested mobile network node and a correspondent node to be implemented with a minimal number of hops between the nested mobile network node and the correspondent node.

There also is a need for arrangement that enables communications between a nested mobile network node and a correspondent node to be implemented using a single bidirectional tunnel, while minimizing increases in packet header sizes, while maintaining security for intermediate routers.

There also is a need for an arrangement that enables mobile routers to establish mobile networks in a manner that maintains privacy and security for the IP addresses and IP address prefixes of the mobile networks.

These and other needs are attained by the present invention, where a mobile router is configured for generating a local router prefix (i.e., a null or invalid address prefix that is not reachable via a wide area network) for use by mobile nodes that attempt to attach to the mobile router. The mobile router, having attached to an attachment router by using a care-of address that specifies an address prefix assigned by the attachment router, outputs a router advertisement message that specifies the null address prefix that is not reachable from a wide area network (i.e., via the attachment router). Upon receiving a message from a mobile host that includes a source address field specifying a mobile host care-of address that includes the null address prefix, the mobile router adds the mobile host care-of address to a reverse routing header and inserts its own care-of address into the source address field. The message is output to its destination with the reverse routing header, ensuring the identity (i.e., IPv6 address) of the mobile router remains anonymous in the wide area network.

One aspect of the present invention provides a method in a mobile router of a mobile network. The method includes attaching to a first router based on receiving a router advertisement message from the first router that specifies a first router address prefix. A mobile router advertisement message is output that specifies a null address prefix that is not reachable from the wide area network via the first router. The method also includes receiving a message from a mobile host having a destination address field that specifies a destination address reachable via the wide area network, and a source address field having a mobile host care-of address that specifies the null address prefix. The message is modified into a modified message by adding the mobile host care-of address to a reverse routing header and inserting a care-of address for the mobile router, that specifies the first router address prefix, to the source address field. The modified message containing the reverse routing header is output to the first router for delivery to the destination address.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to generating secure care of addresses for mobile networks based on generating local router prefixes specifying null or invalid address prefixes. Local router prefixes are generated by top level mobile routers to be null or invalid address prefixes that are not reachable via a wide area network according to existing routing protocols. Typically in a stateless configuration, a mobile router broadcasts an advertisement message that advertises a global mobile prefix, and a visiting mobile node (e.g., host or mobile router) uses the global mobile prefix and generates its own suffix to generate a care-of address. The mobile node will then advertise its presence in the mobile network, and send a binding update to its home agent. However, routing information is supplied with a transmitted IPv6 packet using the reverse routing header as described in the above-incorporated Internet Draft by Thubert et al.

Two privacy issues arise in mobile networking, namely the privacy of the visiting mobile node and the privacy of the mobile network providing a point of attachment to a wide area network for the visiting mobile node. The privacy of the visiting mobile node, addressed by the IETF RFC 3041, available on the world wide web at http://www.ietf.org/rfc/rfc3041.txt?number=3041 (and incorporated in its entirety herein by reference), includes preventing usage of care-of addresses based on the mobile host's unique EUI-64 MAC address, which may reveal the identity of the mobile host by its unique MAC address.

The disclosed embodiment addresses the privacy of the mobile network providing a point of attachment for the visiting mobile host. Currently the Mobile IP protocol described in the above-incorporated Internet Draft by Johnson et al. does not provide a method of hiding the identity of a mobile router: whereas fixed routers as part of the wide area network infrastructure are not concerned with privacy, a mobile host attaches to a mobile router in a nested manner—hence, the unique prefix of the mobile router would reveal the mobile router identity to the mobile host. Hence, the visiting mobile host (and any node that receives a packet from the mobile host) would discover that the mobile router was serving the mobile host. Privacy concerns also arise because it may be undesirable for others to be able to determine the location of the mobile router (e.g., based on determining that the mobile router was associated with the visiting mobile host).

According to the disclosed embodiment, the mobile network prefix of the mobile router is hidden from visiting mobile nodes. Further, the mobile network prefix, while hidden from the visiting mobile nodes, is still available to local fixed nodes that are attached to the mobile router. For example, a mobile vehicle having a top level mobile router will have local fixed nodes (e.g., GPS receiver, engine sensors, onboard computer, etc.) which will use the mobile network prefix for local communications between each other. A visiting mobile node, however, will attach to the top level mobile router using an anonymous prefix for its care-of address, and use its home address for address routing: in other words, since a reverse routing header is used by the visiting mobile node in sending packets to its home agent, the care-of address is merely an artifact used solely by the top level mobile router (the device having generated the anonymous prefix) in routing an incoming packet to the visiting mobile node.

Hence, since routing to the visiting mobile node from the wide area network is based on reaching the globally reachable IPv6 care-of address of the top level mobile router (which is based on the address prefix of the fixed access router), the identity (i.e., IPv6 address) of the top level mobile router (TLMR) of a mobile network remains anonymous to unknown mobile hosts, ensuring that the home agent of the unknown mobile hosts cannot perform attacks on the IPv6 address of the TLMR.

Figure 1:
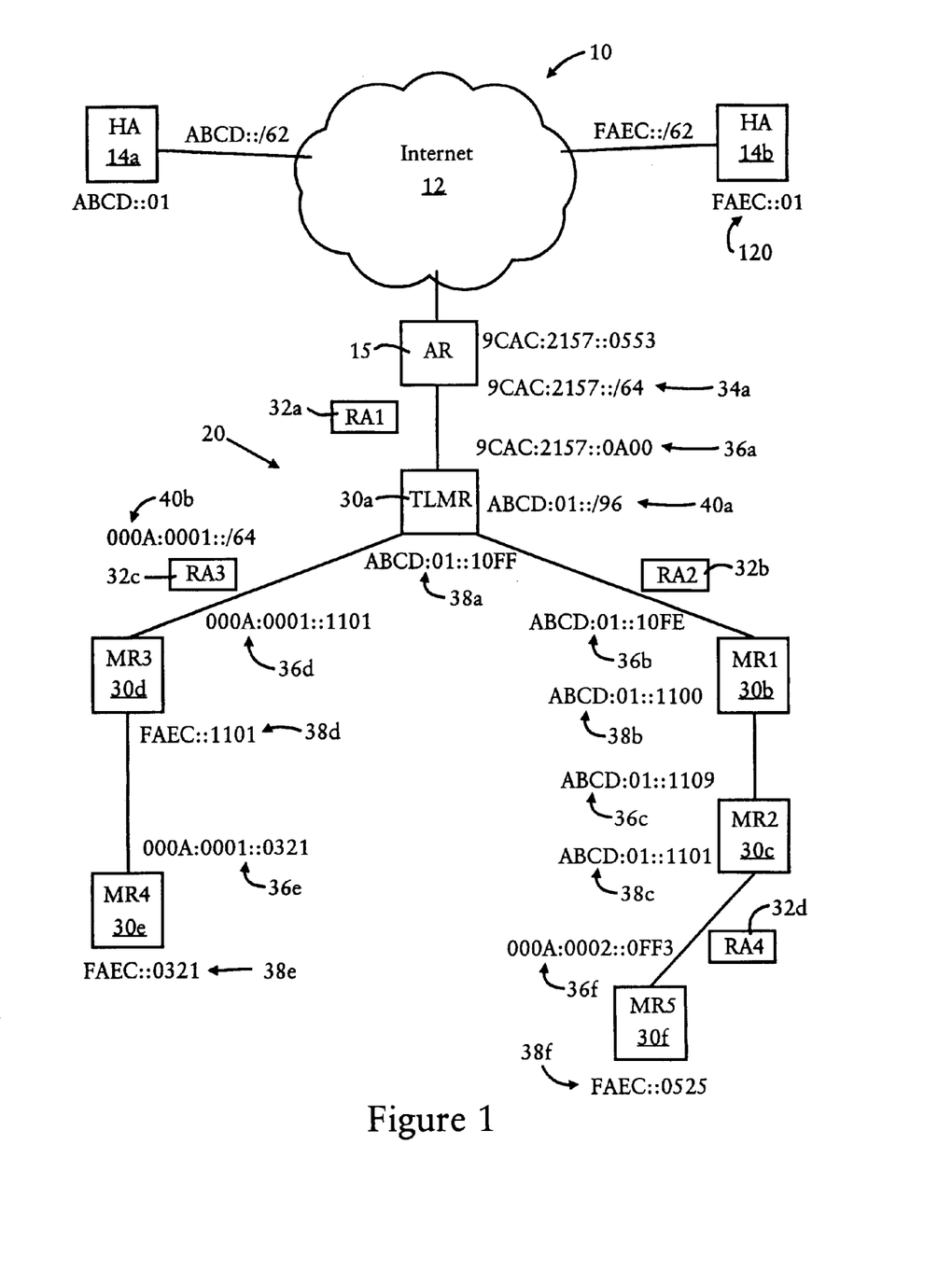
FIG. 1 is a diagram of a mobile network having a mobile router configured for providing anonymous route connections using a local router prefix, according to an embodiment of the present invention.

FIG. 1 is a diagram illustrating in detail a network system 10 that includes a wide area network 12 such as the Internet, a mobile network 20 having mobile routers 30 configured for forming Mobile IP attachments and routing packets according to the above-incorporated Internet Draft by Johnson et al., home agents 14 for serving assigned mobile routers 30, and an attachment router (AR) access router 15 configured for providing a point of attachment for the mobile network 20.

As illustrated in FIG. 1, the attachment router access router 15 is configured for providing an attachment point for the top level mobile router 30a by outputting a router advertisement message 32a (RA1) as specified in the IETF RFC 2461, entitled "Neighbor Discover for IPv6" available on the world wide web at http://www.ietf.org/rfc/rfc2461.txt?number=2461 (the disclosure of which is incorporated in its entirety herein by reference). The attachment router access router 15, which has an IPv6 address "9CAC:2157::0553", is configured for advertising on the wide area network 12 that address prefixes 34a having a value of "9CAC:2157::/64" are reachable via the attachment router access router 15.

The top level mobile router 30a is configured for attaching to the attachment router access router 15 based on the router advertisement message 32a that specifies the address prefix "9CAC:2157::/64" 34a. The top level mobile router 30a attaches to the attachment router access router 15 by assuming a care of address 36a of "9CAC:2157::0A00". Once the top level mobile router 30a has attached to the attachment router access router 15, the top level mobile router 30a sends a binding update message to its home agent 14a as specified in RFC 2461 and the above-incorporated Internet Draft by Thubert et al.

The top level mobile router 30a also is configured for establishing the mobile network 20 according to a tree-based network topology model, for example using the attachment techniques described in commonly-assigned, copending application Ser. No. 10/218,515, filed Aug. 15, 2002, entitled "ARRANGEMENT FOR OPTIMIZING CONNECTIONS BETWEEN ROAMING MOBILE ROUTERS IN A MOBILE NETWORK", the disclosure of which is incorporated in its entirety herein by reference.

The top level mobile router 30a serves as an attachment point for mobile routers 30b and 30c that are part of the same home network (e.g., that share the same home agent 14a). Note that the mobile routers 30b and 30c also may be local fixed nodes (LFNs), for example in the case of the mobile network 20 being implemented in a mobile vehicle. Mobile routers 30a, 30b, and 30c are identifiable as belonging to the same home network based on their respective home addresses 38a, 38b, and 38c having the same prescribed mobile network prefix 40a ("ABCD:01::/96"). In this case, the top level mobile router 30a would output a router advertisement message 32b based on receiving a router solicitation message having a source address specifying the same address prefix as the prescribed mobile network prefix 40a to the top level mobile router 30a.

According to the disclosed embodiment, the top level mobile router 30a also is configured for utilizing a local router prefix to provide anonymous route connections for untrusted, visiting mobile notes. For example, a visiting mobile router 30d, 30e or mobile node may detect an unsolicited router advertisement message, or may request attachment to the mobile network 20. In this case, only the top level mobile router uses the access router address prefix 34a: the top level mobile router 30a will output a different router advertisement message 32c that specifies a null address prefix 40b that is an invalid address prefix that is not reachable via the wide area network 12. Hence, any care of address 36d, 36e, 36f specifying the local router prefix 40b will be an invalid IPv6 address in the Internet 12, ensuring the identity of the top level mobile router 30a remains anonymous. However, the care of addresses 36d, 36e and 36f to specify the local router prefix 40b are still routable within the mobile network 20 by the top level mobile router 30a, since the top level mobile router 30*a* will include a routing table entry that specifies the local router prefix 40*b*.

Hence, since the top level mobile router has stored routing table entries that specify the local router prefix 40*b*, the top level mobile router 40*b* can route incoming packets from the Internet 12 (via the access router 15) having type 2 routing headers specifying the local router prefix 40*b* to the visiting mobile hosts 30*d* or 30*e*. As described below with respect to FIGS. 4 and 5, the local router prefix 40*b* can be used in conjunction with reverse routing headers (type 4 routing headers) and type 2 routing headers, as specified in the above-incorporated Internet Draft by Thubert et al. to route packets between the visiting mobile routers 30*d*, 30*e*, and 30*f* and the home agent 14*b*.

The local router prefix 40*b* is inserted by the TLMR 30*a* in a reverse routing header only to ensure that any return packet from the Internet 12 will include the local router prefix 40*b* in the corresponding type 2 routing header. Hence, only the TLMR 30*a* that generated the local router prefix 40*b* will need to route the packet using the local router prefix 40*b*.

Hence, packets from the Internet 12 will not reach the mobile network 20 unless they specify in their respective destination address fields the care-of address 36*a* ("9CAC: 2157::0A00") for the top level mobile router 30*a*, reachable via the access router according to the advertised prefix 34*a* ("9CAC:2157::/64"). Once the TLMR 30*a* receives the packet from the AR 15, it parses the type 2 routing header, detects the local router prefix 40*b* within the type 2 routing header, and routes the packet based on detecting a routing table entry that specifies the local router prefix 40*b*.

Figure 2:
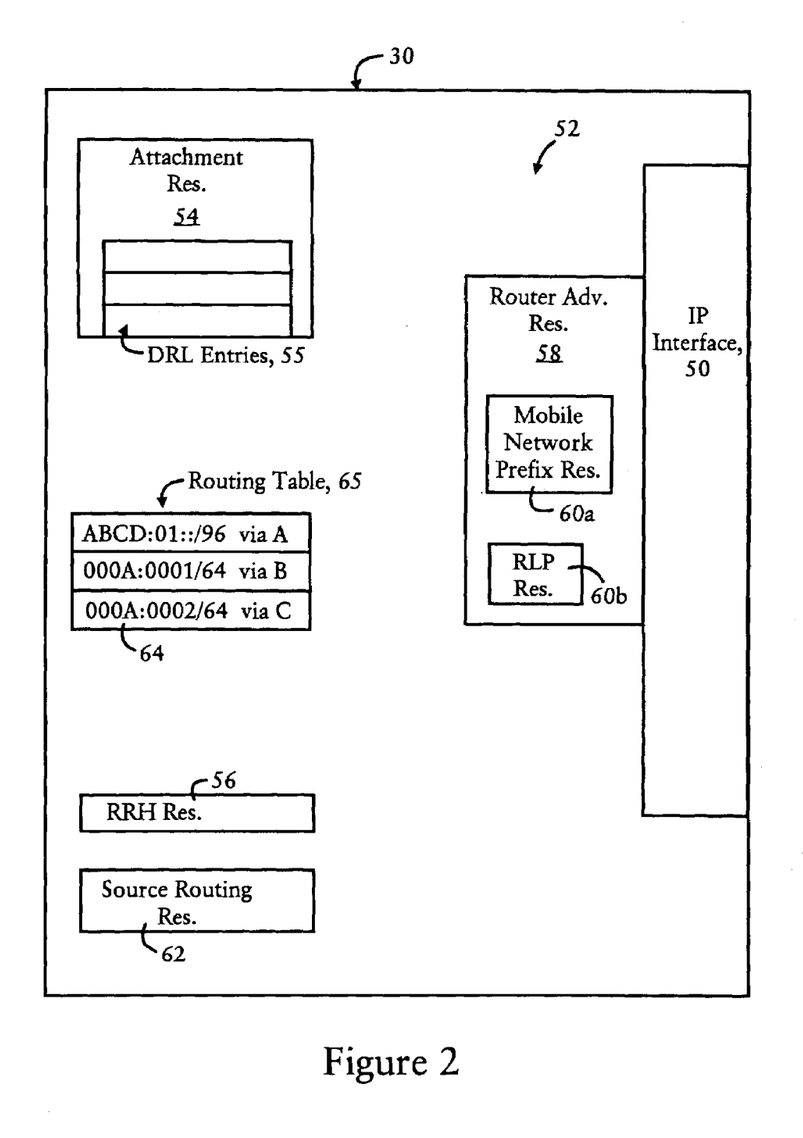
FIG. 2 is a diagram illustrating a mobile router configured for communications within a mobile network, according to an embodiment of the present invention.

FIG. 2 is a diagram illustrating a mobile router 30 (e.g., 30*a*, 30*b*, and 30*c* of FIG. 1) configured for generating a local router prefix for anonymous route connections, according to an embodiment of the present invention.

Each mobile router includes an IPv6 interface 50 for sending and receiving IPv6 packets, and a routing resource 52. The routing resource 52 includes an attachment resource 54 configured for performing router attachment selection and router registration, and generating binding updates. The routing resource 52 also includes a reverse routing header resource 56 configured for reverse routing header processing, described below. The routing resource 52 also includes a router advertisement resource 58 configured for generating the mobile router advertisement messages (e.g., 32*b*, 32*c*), based on using a prescribed mobile network prefix resource 60*a* or a router local prefix (RLP) resource 60*b*. The routing resource 52 also includes a source routing resource 62 configured for routing a packet based on a detected type 2 routing header, and based on retrieving routing table entries 64 from a routing table 65.

The attachment resource of the mobile router 30 is configured for associating with a router advertisement originator by storing the information in the RA message in its default router list 55, and selecting the source of the RA message as its attachment router; the attachment resource 54 then sends a registration message to the attachment router to request it to be a member of the tree.

Router information in the internal default router list 55 is obtained using known router discovery techniques, and by detecting unsolicited router advertisement messages. The router advertisement messages may include a tree information option 66, described in the above-incorporated Thubert et al. and illustrated below with respect to FIG. 3, enabling the mobile router to store within the default router list the attributes of each detected router, as well as the attributes of the tree to which the detected router is attached.

Once the mobile router (e.g., 30*c*) selects a default router (e.g., 30*b*) to be used as an attachment router, the mobile router sends a registration request to the TLMR (e.g., 30*a*) via the routing protocol used inside the cluster, e.g., MANET protocol, or an extension of Mobile IP. Each mobile router (e.g., 30*b*) along the path to the TLMR detects the registration request from the originating mobile router (e.g., 30*c*), and stores in a routing table entry 64 the care-of address 36*c* of the originating mobile router (30*c*) and the source-route path to the originating mobile router.

Hence, the TLMR can store, within its routing table 65: a default route to a wide area network (e.g., the Internet) via its attachment router (as described in the above-incorporated application Ser. No. 10/218,515); and source-route paths to the prefixes inside their cluster (e.g., 40*a*, 40*b*).

Each router having received the registration message registers the specified mobile router 30*c* as a mobile router having sent the registration message and stores in its routing table 65 the address prefix, plus the route path specified by the Source Routing.

Figure 3:
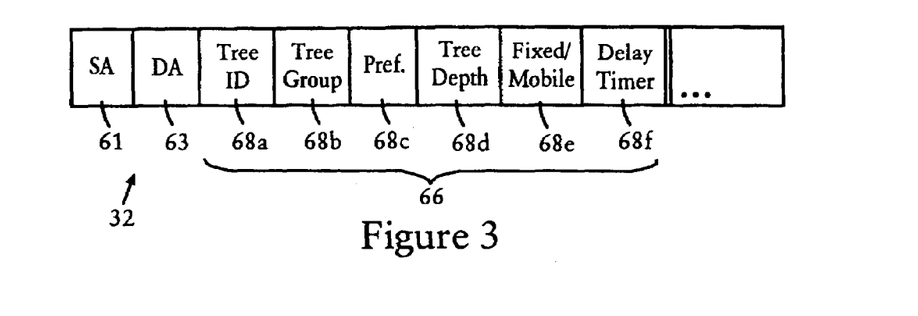
FIG. 3 is a diagram illustrating router advertisement message, generated by the mobile router of FIG. 2, that includes a tree information option.

FIG. 3 is a diagram illustrating in detail a router advertisement message 32 generated by the router advertisement resource 58, according to an embodiment of the present invention. The RA message 32 includes an IPv6 source address (SA) field 61, an IPv6 destination address (DA) field 63, and additional router advertisement fields as described in RFC 2461 (e.g., hop limit, router lifetime, reachable time etc.). According to the disclosed embodiment, a tree information option field 66 is added to the RA message 32 that includes attributes 68, generated by a tree information generator resource within the router advertisement resource 58, that specify the network topology model utilized by the router advertisement originator, identified by its corresponding IP source address (SA) field 61 in the IPv6 header.

For example, the tree information option field 66 includes a tree identifier 68*a*, a tree group identifier 68*b*, a preference field 68*c*, a tree depth field 68*d*, a fixed/mobile field 68*e*, and a delay timer field 68*f*. The tree identifier field 68*a* is configured for storing an IP address of the top level mobile router, or the router local prefix 40*b*. The tree group field 68*b* is configured for storing a tree group identifier, for example an IPv6 address of a mobile router connected to a TLMR or a null care-of address, enabling an attachment resource 54 to distinguish between multiple tree groups (i.e., branches) within the same cluster. The preference field 68*c* is configured for storing a preference value for the originating mobile router as stored in a corresponding preference register, enabling a mobile router receiving the RA message 32 to decide whether to associate with the source of the RA message 32.

The tree depth field 68*d* is configured for storing the depth of the mobile router within the tree, enabling other routers receiving the RA message to determine the relative position of the router advertisement originator within the tree 32. The fixed/mobile field 68*e* is configured for specifying whether the corresponding tree is a grounded tree or a floating tree. In particular, a tree is deemed to be fixed if the top level mobile router is connected to a fixed router. The delay timer field 68*f* is configured for storing a prescribed delay interval utilized by other routers to delay subsequent topology changes, thereby delaying propagation of subsequent RA messages in response to the RA message 32.

The tree information option (TIO) 66 also may include a path checksum field (not shown in FIG. 3), enabling a mobile router to determine whether the path through the tree above it has changed or not; in other words, a path checksum change indicates real path change. When propagating a TIO, an intermediate mobile router builds a byte string using the checksum it receives in a TIO and the 16 bytes of its care of address; the mobile router then overwrites the checksum in the TIO with the result. This operation is performed at the same time as the tree depth incrementing. The TLMR uses a checksum of zeroes for its computation.

Figure 4:
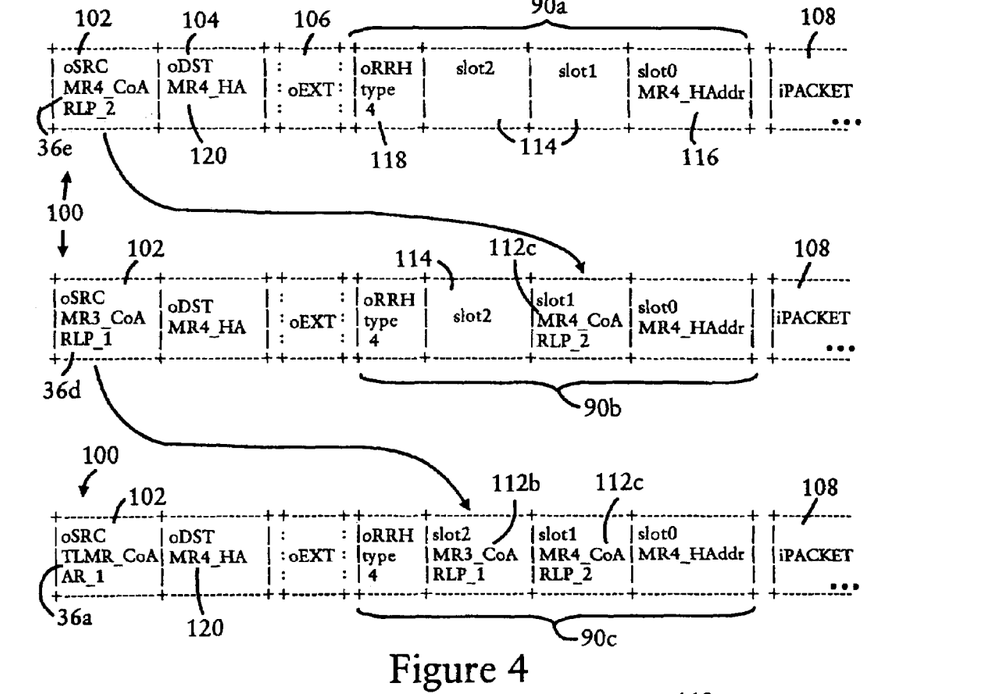
FIG. 4 is a diagram illustrating insertion of addresses within a reverse routing header.

FIG. 4 is a diagram illustrating updating of a reverse routing header 90a, 90b, and 90c by an originating mobile router 30e, the intermediate mobile router 30d, and the top level mobile router 30a, respectively. In particular, FIG. 4 illustrates a packet 100 having a source address field 102, a destination address field 104, extended headers 106, a reverse routing header (e.g., 90a) and an inner packet 108 having been generated by an originating source.

As described in the above incorporated draft by Thubert et al., the mobile router 30e, as the originating mobile router, outputs the packet 100 having the source address field 102 specifying the care of address 36e (MR4_CoA) of the mobile router 30c, and a selected number of empty address slots 114 within the reverse routing header 90a. The empty slots enable the routers 30b and 30a to store their respective care of addresses within the IPv6 header (e.g., within the reverse routing header or the source address field 102).

As illustrated in FIGS. 1 and 4, the mobile routers 30d and 30e are assigned the care of addresses MR4_CoA 36e and MR3_CoA 36d to have the router local address prefix 40b; hence, the care-of addresses of MR4_CoA 36e and MR3_CoA 36d are illustrated as having the respective values RLP_2 and RLP_1. The TLMR 30a is illustrated as having the care-of address AR_1 36a (with the address prefix 34a of the access router 15).

The reverse routing header resource 56 inserts the prescribed home address 38c (MR4_HAddr) for the mobile router 30e in the first slot (slot0), and specifies a routing header of type "4" within a type field 118. The RRH resource 56 inserts the care of address 36e of the mobile router 30e (RLP_2) in the source address field 102, and the address 120 (MR4_HA) of the corresponding home agent 14b in the destination address field 104, and outputs the packet 100 to its attachment router 30d.

The mobile router 30d, in response to detecting the reverse routing header 90a, updates the reverse routing header by inserting the source address value 36e into the detected empty entry field "slot1", resulting in the updated reverse routing header 90b. The mobile router 30d inserts its own care of address 36d (RLP_1) into the source address field 102, and outputs the packet to its attachment router 30a.

The mobile router 30a, in response to detecting the reverse routing header 90a, selectively updates the reverse routing header by inserting the source address value 112b into the detected empty entry field "slot2", resulting in the updated reverse routing header 90a. The mobile router 30a inserts its own care of address 36a (AR_1) into the source address field 102, and outputs the packet to the access router 15 for delivery to the home agent 14b for the mobile router 30e.

The home agent 14b reads the bottom entry to identify the home address of the mobile router 30e, using the entry as if it was a mobile IPv6 home address destination option (i.e., as an index into the binding cache). The home agent 14b now can send a packet directly back by using the reverse routing header 90c and the source address 102 in building a type 2 routing header 113, illustrated in FIG. 5.

Figure 5:
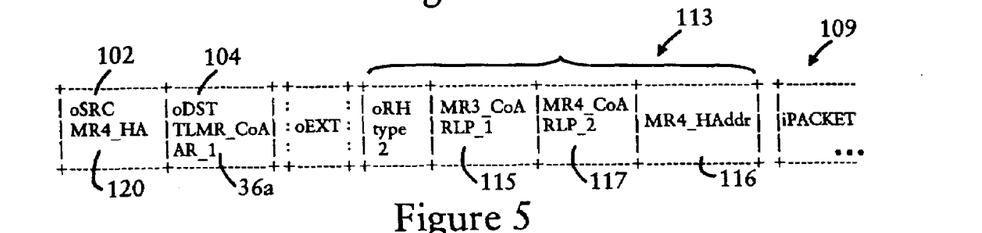
FIG. 5 is a diagram illustrating a packet having a type 2 routing header, received from the wide area network and which includes a care-of address specifying the local router prefix.

FIG. 5 is a diagram illustrating a packet 109, received by the TLMR 30a via the AR 15, that specifies a type 2 routing header 113 generated by the home agent 14b based on the reverse routing header 90c of FIG. 4. The packet 109 includes a source address field 102 that specifies the IPv6 address 120 (MR4_HA) of the home agent 14b, a destination address field 104 that specifies the care-of address 36a of the top-level mobile router, and a type 2 routing header 113 that includes the home address 116 of the mobile router (MR4) 30e having sent the original packet having the reverse routing header 90a.

Note that the home agent address (MR4_HA) 120 in the source address field 102, the care-of address (TLMR_CoA, AR_1) 36a of the TLMR 30a, and the home address (MR4_HAddr) 116 of the mobile router in the type 2 routing header 113 are valid (i.e., globally reachable) IPv6 addresses. In contrast, the care of addresses 115 and 117 for the respective mobile routers 30d and 30e in the routing header 113 are null prefixes (i.e., not reachable from the Internet 12 via the AR 15). Hence, the mobile prefix 40a remains anonymous along the entire path from the home agent 14b to the end mobile node 30e.

The TLMR 30a, however, will include a route table entry 64 (for a limited time interval) that specifies the null prefix. In particular, the TLMR 30a builds a connected route to that prefix over the ingress interface for the lifespan of that 'NULL' prefix. Hence, the TLMR 30a will be able to route the packet to an interface (e.g., a virtual LAN (VLAN)) specified in the matching route table entry. Hence, an entry in the routing header 113 is only read by the mobile router that wrote the corresponding entry in the RRH 90b or 90c.

Figure 6A:
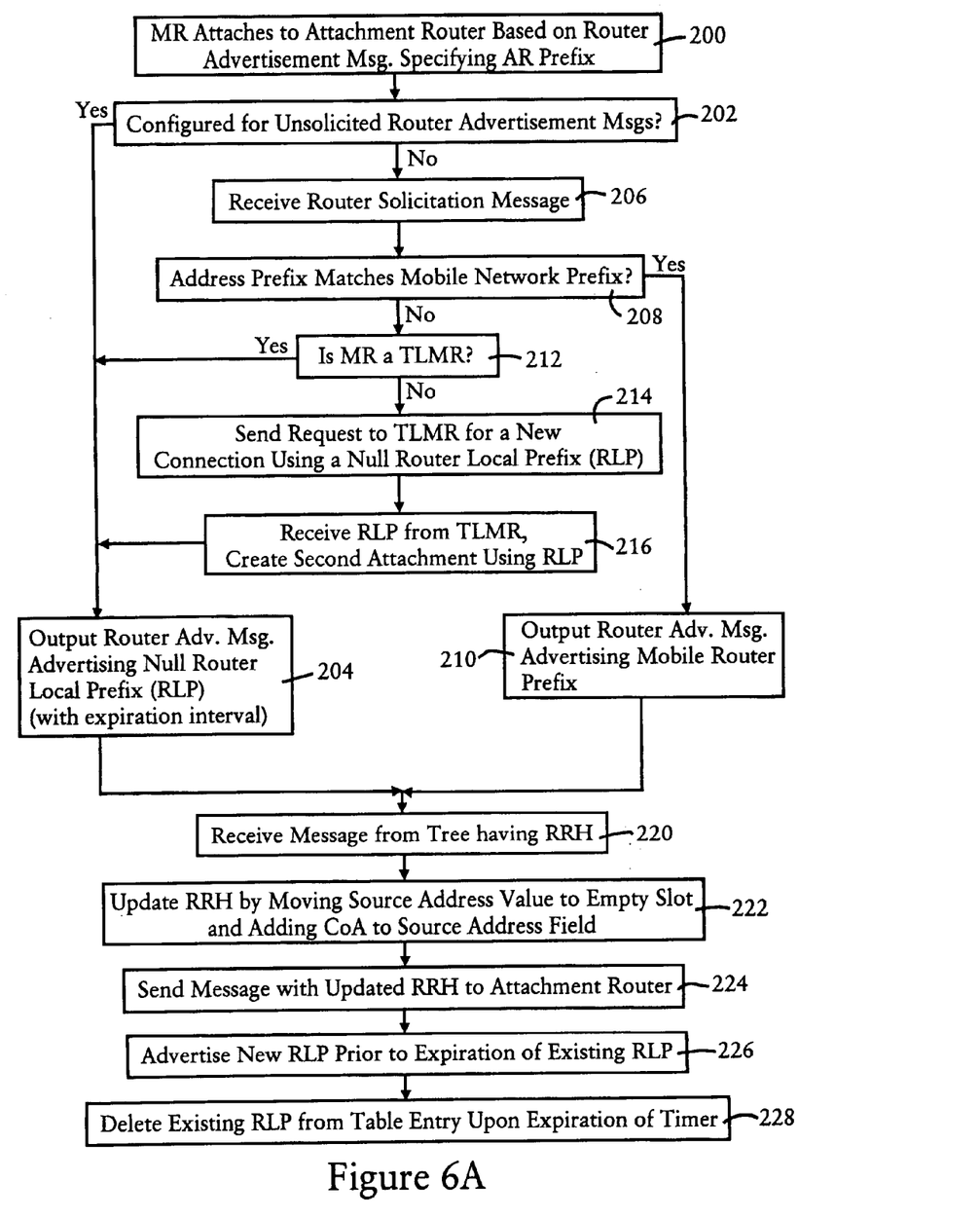
FIGS. 6A and 6B are diagrams summarizing the method by a mobile router of selectively generating a router advertisement message having a local router prefix, and routing packets using the local router prefix, according to an embodiment of the present invention.
Figure 6B:
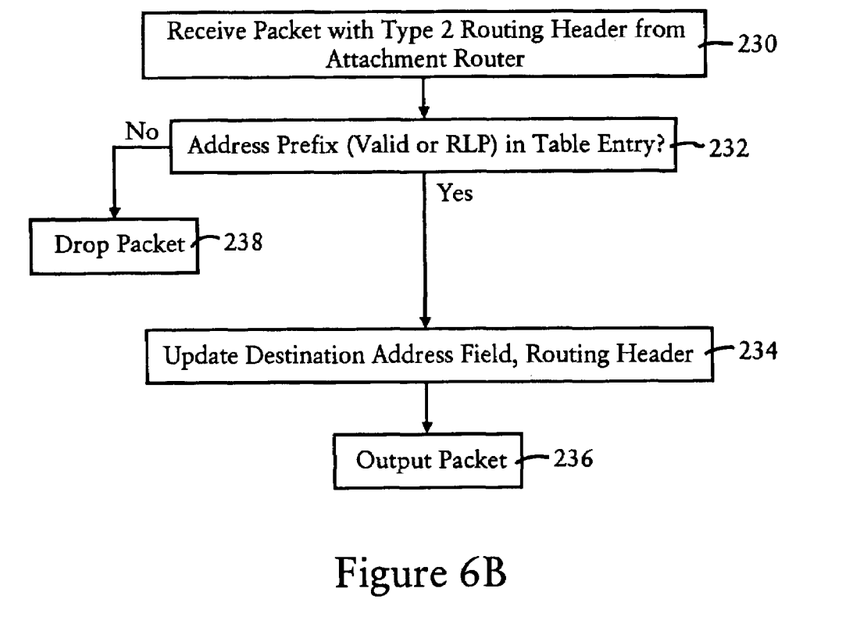

FIGS. 6A and 6B are diagrams summarizing the method by the routing resource 52 of a mobile router 30 (e.g., the TLMR 30a) for generating anonymous routes according to an embodiment of the present invention. The steps described herein with respect to FIGS. 6 and 7 can be implemented as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 200 of FIG. 6A, where the attachment resource 54 of the mobile router 30 (e.g., 30a) attaches to an attachment router (e.g., 15) based on adding a care of address specifying an attachment router prefix in the default router list 55: the care of address is based on the router advertisement message received from the attachment router and specifying the corresponding attachment router prefix. For example, the top level mobile router 30a builds its care of address 36a based on the address prefix 34a advertised by the attachment router 15 in the router advertisement message 32a. Similar attachment procedures are performed by the remaining mobile routers of the tree 20, and including the mobile routers 30b and 30c that belong to the same home network as the top level mobile router 30a.

If in step 202 the mobile router 30 is configured for outputting unsolicited router advertisement messages, the router local prefix resource 60b of the mobile router 30 outputs in step 204a router advertisement message that specifies a null router local prefix (RLP) 40b (e.g., "000A:0001::/64") in the relevant address field (e.g., source address field), and an expiration interval indicating the lifetime of any connections using the advertised null router local prefix 40b. The mobile router 30 also updates its routing table 65 to include a route table entry 64 that specifies the router local prefix and the corresponding expiration interval.

The mobile router 30 also will selectively output a router advertisement message that specifies a null router local prefix 40b in response to a router solicitation message from an unknown source. In particular, assume in step 206 that the mobile router 30 receives a router solicitation message. If in step 208 the router advertisement resource 58 determines that the address prefix of the source address matches the prescribed mobile network prefix 40a of the mobile router 30, the mobile network prefix resource 60a of the mobile router 30 outputs in step 210a router advertisement message that specifies the prescribed mobile network prefix 40a. Hence, mobile nodes belonging to the same mobile network can be configured to share the same prescribed mobile network prefix 40a. However, the mobile router 30 also may be configured to always output router advertisement messages having the null router local prefix.

If in step 208 the router advertisement resource 58 determines that the address prefix of the router solicitation message does not match the prescribed mobile network prefix 40a, the mobile router 30 needs to output a router advertisement message that specifies the null router local prefix. If in step 212 the router is not a top level mobile router, for example mobile router 30c which is further down the tree established by the TLMR 30a, the RLP resource 60b of the mobile router sends in step 214a request to the top level mobile router for a new connection using a null router local prefix assigned by the top level mobile router. The router local prefix resource 60b of the top level mobile router responds to the request sent in step 214 by outputting a router advertisement message that specifies the null router local prefix.

In response to receiving in step 216 the router local prefix from the top level mobile router, the attachment resource 54 of the mobile router 30 creates a new attachment using the router local prefix by adding the router local prefix as an entry to the default router list 55. The mobile router 30 can then output in step 204 the router advertisement message advertising the null router local prefix in step 204. Hence, generation of null router local prefix by the top level mobile router 30a ensures that all routers between the originating mobile node and its home agent are anonymous.

Assume now that the mobile router 30 receives in step 220a message from an attached node and that specifies a reverse routing header 90. The reverse routing header resource 56 of the mobile router 30 updates the reverse routing header in step 222 by moving the source address value (e.g., 36e) to an empty slot 114, and adding its care of address to the source address field 102, as illustrated in FIG. 4. The mobile router 30 sends in step 224 the message with the updated reverse routing header to its attachment router for delivery via the wide area network 12.

Also note that the router advertisement resource 58 may be configured to advertise in step 226 a new router local prefix prior to expiration of the existing router local prefix. The mobile router 30 then deletes in step 228 the existing router local prefix from the routing table entry 64 upon entry of the corresponding expiration timer. The rebuilding of care of addresses provides additional security, since it becomes more difficult to forge and replay reverse routing header packets.

Once the destination of the packet receives the packet including the reverse routing header, the destination (e.g., the home agent 14b) can send a reply by generating a type 2 routing header 113 as illustrated in FIG. 5, specifying the care of address 36a of the top level mobile router 30a in the destination address field 104 and the care of addresses for the remaining hops in the next hop fields 115 and 117.

Referring to FIG. 6B, once the mobile router 30 receives in step 230 the packet specifying the mobile router's care of address in the destination address field and including the type 2 routing header, the source routing resource 62 checks in step 232 whether the next-hop address in the routing header 113 has a prefix which is specified within a route table entry 64. As described above, any address prefix having been advertised by the mobile router 30 will have been added to the routing table 65, regardless of whether the address prefix corresponds to a valid IPv6 address or a null router local prefix. Hence, if the source routing resource 62 detects in step 232a valid table entry for the next hop address, the source routing resource 60 to updates in step 234 the destination address field and routing header, and outputs in step 236 the packet. However if in step 232 the next hop address does not specify an address prefix in the table entry, the packet is dropped in step 238.

According to the disclosed embodiment, use of reverse routing headers and null address prefixes enables routers to maintain an anonymous route for visiting mobile nodes, increasing security for mobile networks. Use of the null address prefix, instead of the unique mobile network prefix, enables the mobile router to remain anonymous by avoiding disclosure of the unique mobile network prefix. Hence, destination nodes are prevented from forging routing headers, and the privacy of the mobile network 20 is maintained. Note that the disclosed visiting mobile routers 30e and 30f alternatively may be mobile host computers configured for generating reverse routing headers.

Note that the null address prefix 40b may be generated dynamically by the TLMR 30a. In particular, a cryptographic resource may be added to the router local prefix resource 60b of FIG. 2 to generate a single null prefix per host. Hence, each new mobile host, in response to detecting an absence of any router advertisement messages, will send a router solicitation message; the TLMR 30a, in response, can dynamically generate a new null address prefix based on the address information (e.g., MAC address) supplied by the new mobile host. The TLMR can then verify that a packet is received from the new mobile host based on its care-of address specifying the dynamically generated null prefix. The TLMR also can use the crypto-generated null address prefix to verify the authenticity of any packets from the Internet 12 having type 2 routing headers 113. Further, the null prefix may be changed over time, enhancing security by using the null address prefix as a time-dependent signature.

Note that the existence of the null address prefix in the Internet 12 is inconsequential, since the only user of that address prefix is the mobile router 30a itself when forwarding a routing header type 2. Further, the mobile router 30a has a connected route to the destination mobile node (e.g., 30e) that is preferred over the route to the "real" address prefix that exists in the Internet 12. Hence, the TLMR 30a would never send a packet (specifying the null address prefix as the destination) over the Internet, but instead would route the packet over the preferred route on its ingress interface.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A mobile router of a mobile network, the mobile router comprising:
   a network interface circuit; and
   a routing circuit configured for attaching to a first router based on receiving a router advertisement message from the first router that specifies a first router address prefix, the routing circuit further configured for:

generating a mobile router advertisement message specifying a null address prefix that is not reachable from the wide area network via the first router, receiving a message from a mobile host having a destination address field that specifies a destination address reachable via the wide area network, and a source address field having a mobile host care-of address that specifies the null address prefix, and modifying the message to a modified message by adding the mobile host care-of address to a reverse routing header and inserting a care-of address for the mobile router, that specifies the first router address prefix, to the source address field;

the network interface circuit configured for outputting the modified message containing the reverse routing header to the first router for delivery to the destination address.

2. The mobile router of claim 1, wherein the network interface circuit is configured for receiving a router solicitation message, from the mobile host, that specifies a mobile host source address, the routing circuit configured for generating the mobile router advertisement message based on the mobile host source address specifying an address prefix distinct from a prescribed mobile network prefix of the mobile router.

3. The mobile router of claim 2, wherein:

the network interface circuit is configured for receiving from a second mobile host a second router solicitation message that specifies a second mobile host source address; and the routing circuit is configured for generating for the second mobile host a second mobile router advertisement message specifying the prescribed mobile network prefix, based on a determined match between the address prefix of the second mobile host source address and the prescribed mobile network prefix.

4. The mobile router of claim 1, wherein:

the network interface circuit is configured for an incoming message from the first router having a next hop address field specifying the mobile host care-of address;

the mobile router further comprises an internal routing table configured for storing routing table entries of address prefixes reachable by the mobile router; and the routing circuit is routing the incoming message to the mobile host based on a detecting the null address prefix of the mobile host care-of address in one of the routing table entries of the internal routing table.

5. The mobile router of claim 1, wherein the routing circuit is configured for:

inserting in the mobile router advertisement message specifying a time interval to expiration of the null address prefix;

generating a second mobile router advertisement message, specifying a second null address prefix that is not reachable from the wide area network via the first router, prior to expiration of the null address prefix;

the mobile router further including an internal routing table configured for storing routing table entries of address prefixes reachable by the mobile router, including the null address prefix and the second null address prefix, the routing circuit configured for removing one of the routing table entries, specifying the null address prefix, upon expiration of the time interval.

6. The mobile router of claim 1, wherein:

the first router is a second mobile router sharing a prescribed mobile network prefix with the mobile router;

the routing circuit configured for sending a request for the null address prefix to the second mobile router in response to receiving a router solicitation message, from the mobile host, that specifies a mobile host source address having an address prefix distinct from the prescribed mobile network prefix;

the routing circuit further configured for attaching to the first router, using the null address prefix for the care-of address, based on receiving the null address prefix as the first router address prefix in the router advertisement message.

7. The mobile router of claim 6, wherein:

the routing circuit is configured for establishing a second attachment to the first router using a second care-of address that specifies the prescribed mobile network prefix;

the network interface circuit is configured for receiving from a second mobile host a second router solicitation message that specifies a second mobile host source address; and the routing circuit is configured for generating for to the second mobile host a second mobile router advertisement message specifying the prescribed mobile network prefix, based on a determined match between the address prefix of the second mobile host source address and the prescribed mobile network prefix.

8. A method in a mobile router of a mobile network, the method comprising:

attaching by the mobile router to a first router based on the mobile router receiving a router advertisement message from the first router that specifies a first router address prefix;

first outputting by the mobile router a mobile router advertisement message specifying a null address prefix that is not reachable from a wide area network via the first router;

receiving by the mobile router a message from a mobile host having a destination address field that specifies a destination address reachable via the wide area network, and a source address field having a mobile host care-of address that specifies the null address prefix;

modifying by the mobile router the message to a modified message by adding the mobile host care-of address to a reverse routing header and inserting a care-of address for the mobile router, that specifies the first router address prefix, to the source address field; and second outputting by the mobile router the modified message containing the reverse routing header to the first router for delivery to the destination address.

9. The method of claim 1, further comprising receiving by the mobile router a router solicitation message, from the mobile host, that specifies a mobile host source address, the first outputting including outputting the mobile router advertisement message based on the mobile host source address specifying an address prefix distinct from a prescribed mobile network prefix of the mobile router.

10. The method of claim 9, further comprising:

receiving by the mobile router and from a second mobile host a second router solicitation message that specifies a second mobile host source address; and third outputting by the mobile router to the second mobile host a second mobile router advertisement message specifying the prescribed mobile network prefix, based on a determined match between the address prefix of the second mobile host source address and the prescribed mobile network prefix.

11. The method of claim 1, further comprising:
receiving by the mobile router an incoming message from the first router having a next hop address field specifying the mobile host care-of address; and
routing by the mobile router the incoming message to the mobile host based on detecting the null address prefix of the mobile host care-of address in a routing table entry of an internal routing table.

12. The method of claim 1, wherein the first outputting step includes specifying a time interval to expiration of the null address prefix, the method further including:
third outputting by the mobile router a second mobile router advertisement message, specifying a second null address prefix that is not reachable from the wide area network via the first router, prior to expiration of the null address prefix; and
removing by the mobile router a routing table entry, specifying the null address prefix, upon expiration of the time interval.

13. The method of claim 1, wherein the first router is a second mobile router sharing a prescribed mobile network prefix with the mobile router, the method further including:
sending by the mobile router a request for the null address prefix to the second mobile router in response to receiving a router solicitation message, from the mobile host, that specifies a mobile host source address having an address prefix distinct from the prescribed mobile network prefix;
wherein the attaching includes receiving the null address prefix as the first router address prefix in the router advertisement message.

14. The method of claim 6, further comprising:
establishing by the mobile router a second attachment to the first router using a second care-of address that specifies the prescribed mobile network prefix;
receiving by the mobile router and from a second mobile host a second router solicitation message that specifies a second mobile host source address; and
third outputting by the mobile router to the second mobile host a second mobile router advertisement message specifying the prescribed mobile network prefix, based on a determined match between the address prefix of the second mobile host source address and the prescribed mobile network prefix.

15. A mobile router of a mobile network, the mobile router comprising:
means for attaching to a first router based on receiving a router advertisement message from the first router that specifies a first router address prefix;
means for generating a mobile router advertisement message specifying a null address prefix that is not reachable from a wide area network via the first router;
means for receiving a message from a mobile host having a destination address field that specifies a destination address reachable via the wide area network, and a source address field having a mobile host care-of address that specifies the null address prefix; and
means for modifying the message to a modified message by adding the mobile host care-of address to a reverse routing header and inserting a care-of address for the mobile router, that specifies the first router address prefix, to the source address field;
wherein the receiving means is configured for outputting the modified message containing the reverse routing header to the first router for delivery to the destination address.

16. The mobile router of claim 15, wherein the receiving means is configured for receiving a router solicitation message, from the mobile host, that specifies a mobile host source address, the generating means configured for generating the mobile router advertisement message based on the mobile host source address specifying an address prefix distinct from a prescribed mobile network prefix of the mobile router.

17. The mobile router of claim 16, wherein:
the receiving means is configured for receiving from a second mobile host a second router solicitation message that specifies a second mobile host source address; and
the generating means is configured for generating for the second mobile host a second mobile router advertisement message specifying the prescribed mobile network prefix, based on a determined match between the address prefix of the second mobile host source address and the prescribed mobile network prefix.

18. The mobile router of claim 15, wherein:
the receiving means is configured for an incoming message from the first router having a next hop address field specifying the mobile host care-of address;
the mobile router further comprising:
(1) an internal routing table configured for storing routing table entries of address prefixes reachable by the mobile router; and
(2) means for routing the incoming message to the mobile host based on a detecting the null address prefix of the mobile host care-of address in one of the routing table entries of an internal routing table.

19. The mobile router of claim 15, wherein the generating means is configured for:
inserting in the mobile router advertisement message specifying a time interval to expiration of the null address prefix;
generating a second mobile router advertisement message, specifying a second null address prefix that is not reachable from the wide area network via the first router, prior to expiration of the null address prefix;
the mobile router further including an internal routing table configured for storing routing table entries of address prefixes reachable by the mobile router, including the null address prefix and the second null address prefix, the generating means configured for removing one of the routing table entries, specifying the null address prefix, upon expiration of the time interval.

20. The mobile router of claim 15, wherein:
the first router is a second mobile router sharing a prescribed mobile network prefix with the mobile router;
the generating means configured for sending a request for the null address prefix to the second mobile router in response to receiving a router solicitation message, from the mobile host, that specifies a mobile host source address having an address prefix distinct from the prescribed mobile network prefix;
the attaching means configured for attaching to the first router, using the null address prefix for the care-of address, based on receiving the null address prefix as the first router address prefix in the router advertisement message.

21. The mobile router of claim 20, wherein:
the attaching means is configured for establishing a second attachment to the first router using a second care-of address that specifies the prescribed mobile network prefix;

the receiving means is configured for receiving from a second mobile host a second router solicitation message that specifies a second mobile host source address; and the generating means is configured for generating for to the second mobile host a second mobile router advertisement message specifying the prescribed mobile network prefix, based on a determined match between the address prefix of the second mobile host source address and the prescribed mobile network prefix.

* * * * *

UNITED STATES PATENT AND TRADEMARK OFFICE
CERTIFICATE OF CORRECTION

PATENT NO. : 7,333,461 B2 Page 1 of 1
APPLICATION NO. : 10/454507
DATED : February 19, 2008
INVENTOR(S) : Thubert et al.

It is certified that error appears in the above-identified patent and that said Letters Patent is hereby corrected as shown below:

Column 14, line 50, please delete "1" and insert --8-- therefor;

Column 15, line 1, please delete "1" and insert --8-- therefor;

Column 15, line 9, please delete "1" and insert --8-- therefor;

Column 15, line 20, please delete "1" and insert --8-- therefor; and

Column 15, line 32, please delete "6" and insert --13-- therefor.

Signed and Sealed this

Twenty-fourth Day of June, 2008

JON W. DUDAS
*Director of the United States Patent and Trademark Office*